(12) United States Patent
Inoue et al.

(10) Patent No.: US 11,328,851 B2
(45) Date of Patent: May 10, 2022

(54) CERAMIC ELECTRONIC COMPONENT AND MANUFACTURING METHOD THEREFOR

(71) Applicant: Murata Manufacturing Co., Ltd., Nagaokakyo (JP)

(72) Inventors: Mitsunori Inoue, Nagaokakyo (JP); Tomohiko Mori, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 381 days.

(21) Appl. No.: 15/960,917

(22) Filed: Apr. 24, 2018

(65) Prior Publication Data

US 2018/0240584 A1 Aug. 23, 2018

Related U.S. Application Data

(62) Division of application No. 14/804,389, filed on Jul. 21, 2015, now abandoned.

(30) Foreign Application Priority Data

Jul. 28, 2014 (JP) .................. 2014-153091

(51) Int. Cl.
*H01F 17/00* (2006.01)
*H01F 41/04* (2006.01)
(Continued)

(52) U.S. Cl.
CPC ......... *H01F 17/0013* (2013.01); *H01F 17/04* (2013.01); *H01F 27/292* (2013.01); *H01F 41/046* (2013.01); *H01F 41/16* (2013.01); *H01G 4/12* (2013.01); *H01G 4/232* (2013.01); *H01G 4/30* (2013.01); *H01C 7/008* (2013.01); *H01C 7/102* (2013.01)

(58) Field of Classification Search
CPC .......... H01F 2027/2809; H01F 41/041; H01F 17/0013
See application file for complete search history.

(56) References Cited

U.S. PATENT DOCUMENTS 3,081,525 A * 3/1963 Delbove ............. H01F 17/0006
174/256
3,223,381 A 1/1966 Thomas
(Continued)

FOREIGN PATENT DOCUMENTS

CN 100454454 C 1/2009
JP 10208907 A * 8/1998
(Continued)

*Primary Examiner* — Elvin G Enad
*Assistant Examiner* — Malcolm Barnes
(74) *Attorney, Agent, or Firm* — ArentFox Schiff LLP (57) ABSTRACT

A method of manufacturing a ceramic electronic component such that Voids of the ceramic element and voids at the interfaces between the ceramic element and the external electrodes are filled with a resin composition by applying, to the ceramic electronic component, a resin-containing solution that has the function of etching the surface of the ceramic element to ionize constituent elements of the ceramic element. The resin composition includes a resin, and cationic elements among the constituent elements of the ceramic elements, which are ionized and deposited from the ceramic element.

11 Claims, 4 Drawing Sheets

(51) Int. Cl.
  *H01F 17/04*   (2006.01)
  *H01F 27/29*   (2006.01)
  *H01F 41/16*   (2006.01)
  *H01G 4/30*    (2006.01)
  *H01G 4/12*    (2006.01)
  *H01G 4/232*   (2006.01)
  *H01C 7/00*    (2006.01)
  *H01C 7/102*   (2006.01)

(56) References Cited

U.S. PATENT DOCUMENTS

| | | | | |
|---|---|---|---|---|
| 9,412,519 B1* | 8/2016 | Trinh | | H01G 4/2325 |
| 2001/0035810 A1* | 11/2001 | Heistand, II | | H01C 1/028 |
| | | | | 338/226 |
| 2003/0134133 A1* | 7/2003 | Kimura | | H01G 2/12 |
| | | | | 428/469 |
| 2005/0113472 A1* | 5/2005 | Fillmore | | H01L 21/76825 |
| | | | | 521/50.5 |
| 2005/0117274 A1* | 6/2005 | Miyauchi | | H01G 4/12 |
| | | | | 361/321.2 |
| 2006/0246367 A1* | 11/2006 | Herbert | | C09D 11/037 |
| | | | | 430/106.1 |
| 2007/0253145 A1* | 11/2007 | Kurozumi | | C01G 23/006 |
| | | | | 361/321.4 |
| 2008/0160199 A1* | 7/2008 | Nadupparambil Sekharan | | |
| | | | | B05D 7/142 |
| | | | | 427/386 |
| 2009/0324982 A1* | 12/2009 | Aramaki | | B22F 7/04 |
| | | | | 428/548 |
| 2010/0067170 A1* | 3/2010 | Koga | | H01G 4/228 |
| | | | | 361/306.3 |
| 2011/0014448 A1* | 1/2011 | Hara | | H01B 3/006 |
| | | | | 428/220 |
| 2011/0154660 A1* | 6/2011 | Kim | | H01B 1/22 |
| | | | | 29/846 |
| 2013/0222101 A1* | 8/2013 | Ito | | H01F 17/04 |
| | | | | 336/83 |
| 2013/0250480 A1* | 9/2013 | Ahn | | H01G 4/129 |
| | | | | 361/321.2 |

FOREIGN PATENT DOCUMENTS

| | | | | |
|---|---|---|---|---|
| JP | H10208907 A | * | 8/1998 | ............ H01C 1/034 |
| JP | H10208907 A | | 8/1998 | |
| JP | 2002033237 A | | 1/2002 | |
| JP | 2004-500719 A | | 1/2004 | |
| JP | 2005-228904 A | | 8/2005 | |

* cited by examiner

CERAMIC ELECTRONIC COMPONENT AND MANUFACTURING METHOD THEREFOR

CROSS REFERENCE TO RELATED APPLICATIONS

The present application is a divisional of application Ser. No. 14/804,389, filed Jul. 21, 2015, which claims priority to Japanese Patent Application No. 2014-153091, filed Jul. 28, 2014, the entire contents of each of which are incorporated herein by reference.

BACKGROUND OF THE INVENTION

1. Field of the Invention

The present invention relates to a ceramic electronic component and a method for manufacturing the component, and more particularly, to a ceramic electronic component such as, for example, a laminated coil, a multilayer ceramic capacitor, a thermistor, a varistor, and a multilayer substrate, which includes a ceramic element and an electrode provided on the ceramic element surface, and a method for manufacturing the component.

2. Description of the Related Art

Ceramic electronic components may have cracks (voids) generated in ceramic elements. In addition, gaps (voids) are likely to be generated at the joint interfaces between the ceramic elements and heterogeneous materials such as electrodes provided on the surfaces of the ceramic elements. Characteristic degradation (insulation degradation) may be caused by ingress of impurities such as moisture into the ceramic electronic components through the voids of the ceramic elements or the voids at the interfaces between the ceramic elements and the electrodes.

Therefore, as measures against this situation, techniques have been proposed for coating ceramic element surfaces of ceramic electronic components with resin, as described in JP 2004-500719 A.

Coating the ceramic element surfaces of the ceramic electronic components can reduce the influence of chemical erosion on the ceramic elements, which is caused by plating solution in the case of plating or flux in the case of mounting. Further, coating the ceramic element surfaces can, in the case of plating, suppress the growth by plating onto the ceramic element surfaces, and reduce defective conductivity of the electronic component.

Furthermore, coating the ceramic element surfaces can prevent ingress of moisture, plating solutions, flux, etc. into the electronic components, and prevent reliability degradation of the electronic components, or electrical property degradation due to deposition by plating onto internal electrodes.

SUMMARY OF THE INVENTION

However, as in JP2004-500719 A, in the case of coating the ceramic element surface of the ceramic electronic component with the resin, the adhesion of the resin on the surface of the ceramic electronic component, excluding voids of the ceramic element, increases the size of the ceramic electronic component. Thus, the ceramic electronic component undergoes a decrease in characteristic per volume.

Further, in the case of the resin coating according to the prior art in Japanese Patent Application Laid-Open No. 2004-500719, it is not possible to peel the resin (film) by barrel polishing because of the firm adhesion of the resin to the ceramic element. Moreover, while the prior art in JP2004-500719 A involves a step of removing the resin, it is difficult to selectively remove the resin which adheres to the ceramic element surface while leaving only the resin which adheres to voids of the ceramic element and at the interfaces between the ceramic element and electrodes.

Therefore, an object of the present invention is to provide a ceramic electronic component and a method for manufacturing the component, which can prevent characteristic degradation due to inward ingress of impurities such as moisture, and suppress the decrease in characteristic per volume.

The present invention provides a ceramic electronic component including a ceramic element and an electrode provided on the ceramic element surface. Voids of the ceramic element and at the interface between the ceramic element and the electrode are at least partially filled with a resin composition including a resin and a cationic element among constituent elements of the ceramic element.

Among the constituent elements of the ceramic element, the cationic element eluted and deposited from the ceramic element is contained in the resin composition. Furthermore, the constituent elements of the ceramic element include at least one of Ba, Ti, Ca, Zr, Fe, Ni, Cu, Zn, Mn, Co, and Si. In addition, a plated film may be formed on the electrode provided on the ceramic element surface.

In the ceramic electronic component according to the present invention, the resin preferably has a thermal decomposition temperature of 240° C. or higher. Furthermore, the resin preferably includes at least one of an epoxy resin, a polyimide resin, a silicone resin, a polyamideimide resin, a polyetheretherketone resin, and a fluorine-containing resin. Thus, the ceramic electronic component has heat resistance improved.

In addition, in the ceramic electronic component according to the present invention, the resin composition preferably contains resin components cross-linked by heating. Thus, the resin composition can be formed in a short period of time.

Furthermore, the present invention provides a method for manufacturing a ceramic electronic component including a ceramic element, an electrode provided on the ceramic element surface, and a resin composition that at least partially fills voids of the ceramic element and at the interface between the ceramic element and the electrode.

The method comprises the steps of providing, to the ceramic element surface, a resin-containing solution that has the function of etching the ceramic element surface to ionize constituent elements of the ceramic element to form a resin composition including a resin and a cationic element among the constituent elements of the ceramic element, which are ionized and deposited from the ceramic element, at least partially in the voids of the ceramic element and at the interface between the ceramic element and the electrode.

Methods for providing the resin-containing solution to the ceramic element surface include methods such as immersion and application, and preferably with the ceramic element in the resin-containing solution, the resin-containing solution and the ceramic element are subjected to agitation, or the voids are subjected to vacuum/pressure impregnation with the resin-containing solution. In addition, the resin means a resin that is adjusted to have a polar group such as a carboxyl group and an amino group, and able to be, as an organic substance or a composite of organic and inorganic substances, dissolved or dispersed in an aqueous solvent.

The resin-containing solution according to the present invention has a resin dispersed in an aqueous solvent, and has a component that etches (dissolves) the ceramic, and a component that reacts the dissolved ceramic ions with the resin component.

In the present invention, the resin-containing solution etches (dissolves) the ceramic element surface to ionize the constituent elements of the ceramic element. Then, the resin component dissolved (dispersed) in the resin-containing solution reacts with cationic elements among the ionized constituent elements of the ceramic element to neutralize the charge of the resin component. As a result, the resin component settles out along with cationic elements among the constituent elements of the ceramic element.

Specifically, the anionic resin component stably dispersed in the aqueous solvent reacts with the cationic elements among the constituent elements of the ceramic element to settle out through destabilization at the ceramic element surface.

The reaction between the ionized constituent elements of the ceramic element and the resin-containing solution is likely to be developed at the ceramic element surface, and the reactants are thus believed to be immobilized to the ceramic element surface. In contrast, at the electrode formed on the ceramic element surface, because there is almost no etching reaction developed, fewer ionized constituent elements of the ceramic element will not develop any reaction with the resin-containing solution. Therefore, the resin composition is selectively deposited only on the ceramic element surface.

The resin composition formed according to the present invention passes through a gel state of emulsions aggregated as a precursor. Therefore, at this stage in the gel state, the reactant deposited on a part of the ceramic element surface, excluding the voids of the ceramic element and at the interfaces between the ceramic element and the electrode, can be easily removed by, for example, barrel polishing. Accordingly, the resin composition can be formed partially in the voids of the ceramic element and at the interface between ceramic element and the electrode in the present invention.

According to the present invention, the resin composition is formed at least partially in the voids of the ceramic element and at the interfaces between the ceramic element and the electrode. Therefore, the ceramic electronic component can be obtained which can prevent characteristic degradation due to inward ingress of impurities such as moisture. In addition, the invention can be also adapted to the ceramic electronic component which has voids or electrodes in complex shapes, because the resin composition is formed by chemical action.

Moreover, the ceramic electronic component undergoes almost no increase in size because the resin composition is formed partially in the voids of the ceramic element and at the interface between the ceramic element and the electrode in the ceramic electronic component according to the present invention. Therefore, the ceramic electronic component can be obtained which can suppress the decrease in characteristic per volume.

The foregoing object, and other objects, features, and advantages of the invention will become more evident from the following description of embodiments, which will be provided with reference to the drawings.

DETAILED DESCRIPTION OF THE INVENTION

Embodiments of a ceramic electronic component and a manufacturing method therefor according to the present invention will be described.

A ceramic electronic component according to the present invention will be described with reference to a laminated coil as an example.

Figure 1:
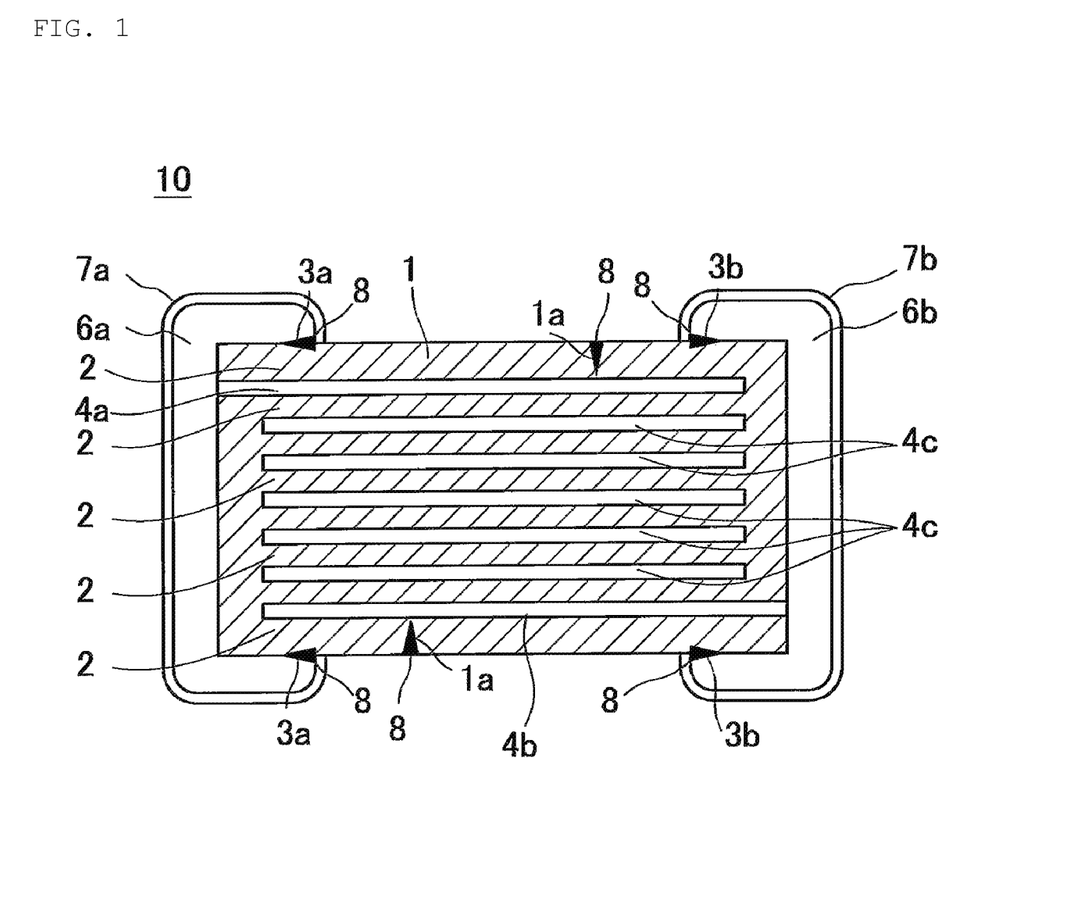
FIG. 1 is a cross-sectional view illustrating an embodiment of a ceramic electronic component according to the present invention.

FIG. 1 is a cross-sectional view illustrating a laminated coil 10 that is a ceramic electronic component according to the present invention.

The laminated coil 10 includes a substantially cuboid ceramic element 1, and external electrodes 6a and 6b formed on right and left ends of the ceramic element 1.

The ceramic element 1 is a laminated body obtained by stacking a number of ceramic layers 2 and a number of internal electrodes 4a, 4b, and 4c in the thickness direction.

The ceramic layers 2 are composed of a magnetic ceramic material such as a Cu—Zn ferrite and a Ni—Zn ferrite.

The internal electrode 4a, for example, formed to have the shape of J in planar view, has an end extended to the left end surface of the ceramic element 1, and electrically connected to the external electrode 6a. The internal electrode 4b, for example, formed to have the shape of J in planar view, has an end extended to the right end surface of the ceramic element 1, and electrically connected to the external electrode 6b. The multiple internal electrodes 4c are formed to have, for example, the shape of C in planar view between the respective ceramic layers 2 between the internal electrodes 4a and 4b. In addition, the internal electrode 4a, the multiple internal electrodes 4c, and the internal electrode 4b are connected in the form of a coil and in series, with respective through-hole electrodes that penetrate through the respective ceramic layers 2. Thus, a coil function is achieved between the external electrodes 6a and 6b. The internal electrodes 4a, 4b, and 4c and the through-hole electrodes are composed of Ag, Cu, Ni, Pd, or an alloy of the metals, etc.

The external electrodes 6a and 6b respectively have, on the surfaces thereof, plated films 7a and 7b formed. The plated films 7a and 7b protect the external electrodes 6a and 6b, and make solderability of the external electrodes 6a and 6b favorable.

This laminated coil 10, for example, has voids 1a at the surface of the ceramic element 1, and has voids 3a and 3b at the interfaces between the ceramic element 1 and the external electrodes 6a and 6b. Therefore, the voids 1a of the ceramic element 1 and the voids 3a and 3b at the interfaces between the ceramic element 1 and the external electrodes 6a and 6b are each filled with a resin composition 8. The resin composition 8 includes a resin, and cationic elements among the constituent elements of the ceramic element 1.

The cationic elements among the constituent elements of the ceramic element 1, which are contained in the resin composition 8, are deposited by partial elution from the ceramic layers 2 of the ceramic element 1. More specifically, among the constituent elements of the ceramic element 1, the cationic elements include Sr, Sn, Fe, Ni, Cu, Zn, Mn, and Co each eluted and deposited from the Cu—Zn ferrite, Ni—Zn ferrite, or the like of the ceramic layers 2.

The resin included in the resin composition 8 is a polyvinylidene chloride resin, an acrylic resin, an epoxy resin, a polyimide resin, a silicone resin, a polyamideimide resin, a polyetheretherketone resin, a fluorine-containing resin, or the like. The laminated coil 10 typically undergoes a mounting step with soldering, and the resin composition 8 thus preferably has high heat resistance (240° C. or higher). Accordingly, a resin is preferred which has a thermal decomposition temperature of 240° C. or higher. In this regard, there is a relationship of: (polyvinylidene chloride resin, acrylic resin)<epoxy resin<(polyimide resin, polyamideimide resin, polyetheretherketone resin, silicone resin, fluorine-containing resin) in terms of heat resistance.

In the thus configured laminated coil 10, the resin composition 8 includes the resin and the cationic elements among the constituent elements of the ceramic element 1, and the resin composition 8 is formed in the voids 1a of the ceramic element 1 of the laminated coil 10, and the voids 3a and 3b at the interfaces between the ceramic element 1 and the external electrodes 6a and 6b. Therefore, characteristic degradation due to ingress of impurities such as moisture into the laminated coil 10 can be prevented. In this way, the laminated coil 10 can be obtained which can make an improvement in reliability. In addition, the invention can be also adapted to the laminated coil 10 which has voids or electrodes in complex shapes, because the resin composition 8 is formed by chemical action.

Furthermore, in this laminated coil 10, the resin composition 8 is formed partially in the voids 1a of the ceramic element 1, and the voids 3a and 3b at the interfaces between the ceramic element 1 and the external electrodes 6a and 6b, and the laminated coil 10 thus undergoes almost no increase in size. Therefore, the laminated coil 10 can be obtained which can suppress the decrease in characteristic per volume.

Figure 2:
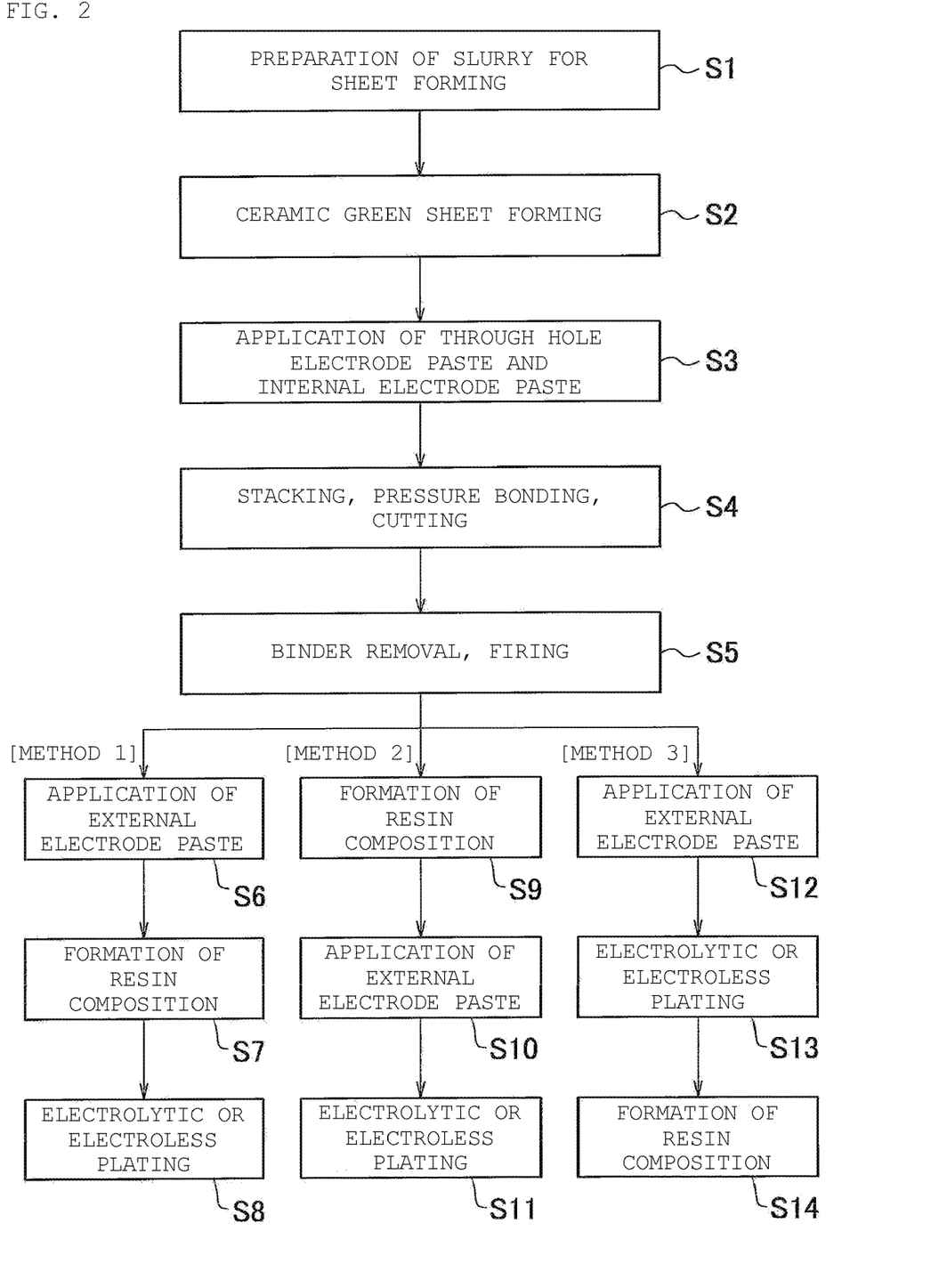
FIG. 2 is a flowchart showing an embodiment of a method for manufacturing the ceramic electronic component according to the present invention.

Next, a method for manufacturing the ceramic electronic component according to the present invention will be described with reference to the laminated coil 10 as an example. FIG. 2 is a flowchart showing a method for manufacturing the laminated coil 10.

In a step S1, an organic binder, a dispersant, a plasticizer, etc. are added to a magnetic ceramic material such as Cu—Zn ferrite or Ni—Zn ferrite, thereby preparing slurry for sheet forming.

Next, in a step S2, the slurry for sheet forming is formed into sheets by a doctor blade method to provide rectangular ceramic green sheets.

Next, in a step S3, a through-hole electrode paste containing Ag is applied by a well-known method to form electrode paste columns which should serve as through-hole electrodes, so as to penetrate through the ceramic green sheets in the thickness direction, and an internal electrode paste containing Ag is then applied by a screen printing method onto the ceramic green sheets to form electrode paste films which should serve as the internal electrodes 4a, 4b, and 4c.

Next, in a step S4, the multiple ceramic green sheets with the electrode paste films and electrode paste columns formed are stacked so as to locate the electrode paste films and the electrode paste columns in predetermined positions, and subjected to pressure bonding. This laminated ceramic green sheet is cut into a size for individual ceramic elements 1 to provide a number of unfired ceramic elements 1.

Next, in a step S5, the unfired ceramic elements 1 are subjected to binder removal treatment at 400° C. to 500° C. Thereafter, the unfired ceramic elements 1 are subjected to firing for 2 hours at a temperature of 900° C. to 1000° C. to provide sintered ceramic elements 1. The ceramic green sheets, the electrode paste films, and the electrode paste columns are subjected to co-firing, and the ceramic green sheets serve as the ceramic layers 2, the electrode paste films serve as the internal electrodes 4a, 4b, and 4c, and the electrode paste columns serves as through-hole electrodes.

Further, in the subsequent step, there are three types of manufacturing methods [Method 1] to [Method 3] shown.

(a) In the case of [Method 1]

In the case of the manufacturing method [Method 1], in a step S6, an external electrode paste (AgPd alloy paste) is applied to both ends of the sintered ceramic element 1. Thereafter, on the sintered ceramic elements 1, the external electrode paste is baked at a temperature of 900° C. to form the external electrodes 6a and 6b electrically connected respectively to the internal electrodes 4a and 4b.

Next, in a step S7, to the ceramic elements 1, a resin-containing solution is provided by an immersion method, or applied by spin coating. In order to make the resin-containing solution more likely to enter the voids 1a of the ceramic elements 1 and the voids 3a and 3b at the interfaces between the ceramic elements 1 and the external electrodes 6a and 6b, it is preferable to agitate the resin-containing solution and the ceramic elements 1, or vacuum/pressure-impregnate the voids 1a, 3a, and 3b with the resin-containing solution, with the ceramic element 1 in the resin-containing solution.

The resin-containing solution has the function of etching the surfaces of the ceramic elements 1 to ionize the constituent elements of the ceramic elements 1, and includes a resin component dissolved or dispersed in an aqueous solvent. Furthermore, the resin-containing solution includes a neutralizer for dissolution or dispersion of the resin component, and if necessary, a surfactant for reaction with cationic elements among the dissolved constituent elements of the ceramic elements.

Therefore, the resin-containing solution etches (dissolves) the surfaces of the ceramic elements 1 to ionize the constituent elements of the ceramic elements 1. In regard to the etching (dissolving) function of the resin-containing solution, the etching (dissolving) reaction can be developed just with the constituents of the resin-containing solution without adding any etching promoting constituent, because the highly ionic metal element is contained in the case of the laminated coil 10. More specifically, the etching (dissolving) reaction proceeds when the pH of the resin-containing solution is set in a pH range (pH<5, pH>11) in which the highly ionic metal element is present stably as ions.

Then, the resin component dissolved (dispersed) in the resin-containing solution reacts with cationic elements among the ionized constituent elements of the ceramic elements 1 to neutralize the charge of the resin component. As a result, the resin component settles out along with cationic elements among the constituent elements of the ceramic elements 1, and deposits on the ceramic element surfaces. Accordingly, in the deposited resin component, cationic elements are incorporated among the dissolved and ionized constituent elements of the ceramic elements 1.

The resin composition 8 formed passes through a gel state of emulsions aggregated as a precursor. Therefore, at this stage in the gel state, the reactant deposited on a part of the ceramic element surface, excluding the voids 1a of the ceramic element 1 and the voids 3a and 3b at the interfaces between the ceramic element 1 and the external electrodes 6a and 6b, can be easily removed by, for example, barrel polishing. Accordingly, the resin composition 8 can be formed partially in the voids 1a of the ceramic element 1, and the voids 3a and 3b at the interfaces between the ceramic element 1 and the external electrodes 6a and 6b. Further, thereafter, the ceramic elements 1 may be washed with a polar solvent such as pure water, if necessary.

The resin included in the resin-containing solution is a polyvinylidene chloride resin, an acrylic resin, an epoxy resin, a polyimide resin, a silicone resin, a polyamideimide resin, a polyetheretherketone resin, a fluorine-containing resin, or the like, but basically, it does not matter what kind as long as the resin is deposited by the present treatment.

In this way, the resin composition 8 including the cationic elements among the constituent elements of the ceramic elements 1, which are ionized and deposited from the ceramic elements 1, and the resin is formed in the voids 1a of the ceramic elements 1 and the voids 3a and 3b at the interfaces between the ceramic elements 1 and the external electrodes 6a and 6b. Thereafter, the resin composition 8 is subjected to heating treatment. The heating treatment is intended to accelerate a cross-linking reaction between the resin components in the resin-containing solution deposited, and the heating condition varies depending on the type of the resin component. In general, the cross-linking reaction is likely to proceed under high temperature. However, the excessively increased temperature increases the decomposition reaction of the resin component. Accordingly, there is a need to set optimum temperature and time in accordance with the resin component.

Figure 3:
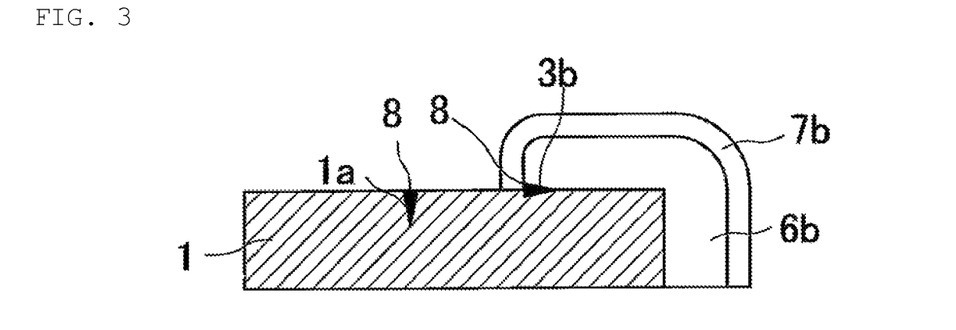
FIG. 3 is an enlarged cross-sectional view of an external electrode.

Next, in a step S8, the plated films 7a and 7b are formed on the external electrodes 6a and 6b by an electrolytic or electroless plating method. The plated films 7a and 7b adopt, for example, a double structure composed of a Ni plated film as a lower layer and an Sn plated film as an upper layer. FIG. 3 is an enlarged cross-sectional view of a site with the external electrode 6b formed by the manufacturing method [Method 1].

(b) In the case of [Method 2]

In the case of the manufacturing method [Method 2], in a step S9, to the ceramic elements 1, a resin-containing solution is provided by an immersion method, or applied by spin coating, or preferably provided or applied by carrying out agitation or vacuum/pressure impregnation. The resin-containing solution etches (dissolves) the surfaces of the ceramic elements 1 to ionize the constituent elements of the ceramic elements 1. Then, the resin component dissolved (dispersed) in the resin-containing solution reacts with cationic elements among the ionized constituent elements of the ceramic elements 1 to neutralize the charge of the resin component. As a result, the resin component settles out along with cationic elements among the constituent elements of the ceramic elements 1, and deposits over substantially the entire surfaces of the ceramic elements 1. Accordingly, in the deposited resin component, cationic elements are incorporated among the dissolved and ionized constituent elements of the ceramic elements 1. It is to be noted that after providing the resin-containing solution, the ceramic elements 1 may be washed with a polar solvent such as pure water, if necessary.

In this way, the resin composition 8 including the cationic elements among the constituent elements of the ceramic elements 1, which are ionized and deposited from the ceramic elements 1, and the resin is formed in the voids 1a of the ceramic elements 1. Thereafter, the resin composition 8 is subjected to heating treatment.

Next, in a step S10, an external electrode paste is applied to both ends of the ceramic elements 1.

Thereafter, on the ceramic elements 1, the external electrodes 6a and 6b electrically connected respectively to the internal electrodes 4a and 4b are formed at a temperature at which the resin composition 8 undergoes no thermal decomposition.

Figure 4:
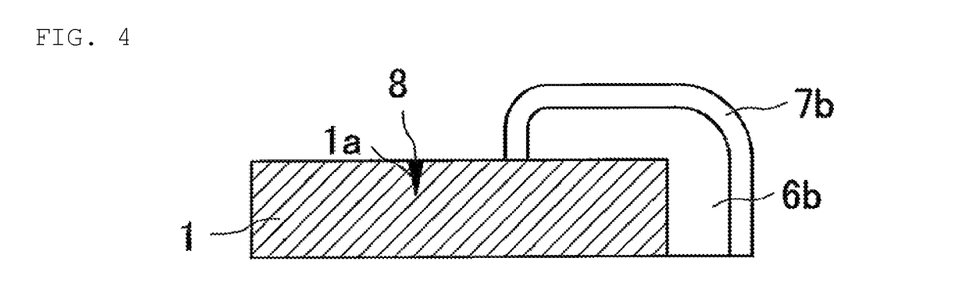
FIG. 4 is an enlarged cross-sectional view of an external electrode of another ceramic electronic component.

Next, in a step S11, the plated films 7a and 7b are formed on the external electrodes 6a and 6b by an electrolytic or electroless plating method. FIG. 4 is an enlarged cross-sectional view of a site with the external electrode 6b formed by the manufacturing method [Method 2].

(c) In the case of [Method 3]

In the case of the manufacturing method [Method 3], in a step S12, an external electrode paste is applied to both ends of the ceramic elements 1. Thereafter, on the ceramic elements 1, the external electrode paste is baked at a temperature of 900° C. to form the external electrodes 6a and 6b electrically connected respectively to the internal electrodes 4a and 4b.

Next, in a step S13, the plated films 7a and 7b are formed on the external electrodes 6a and 6b by an electrolytic or electroless plating method.

Next, in a step S14, to the ceramic elements 1, a resin-containing solution is provided by an immersion method, or applied by spin coating, or preferably provided or applied by carrying out agitation or vacuum/pressure impregnation. The resin-containing solution etches (dissolves) the surfaces of the ceramic elements 1 to ionize the constituent elements of the ceramic elements 1. Then, the resin component dissolved (dispersed) in the resin-containing solution reacts with cationic elements among the ionized constituent elements of the ceramic elements 1 to neutralize the charge of the resin component. As a result, the resin component settles out along with cationic elements among the constituent elements of the ceramic elements 1, and deposits on the ceramic element surfaces. Accordingly, in the deposited resin component, cationic elements are incorporated among the dissolved and ionized constituent elements of the ceramic elements 1. It is to be noted that after providing the resin-containing solution, the ceramic elements 1 may be washed with a polar solvent such as pure water, if necessary.

Figure 5:
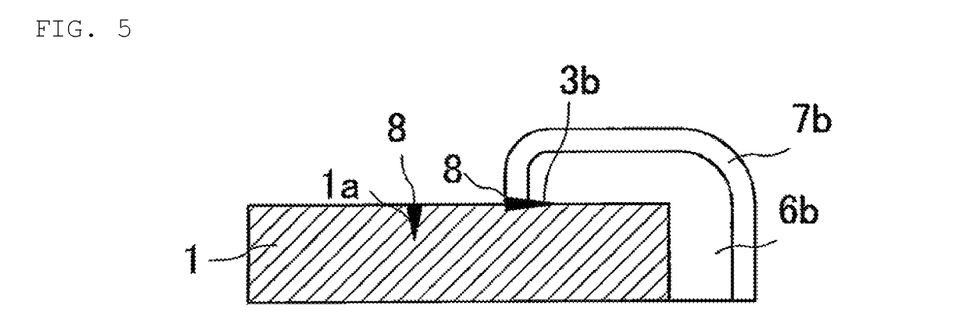
FIG. 5 is an enlarged cross-sectional view of yet another external electrode of another ceramic electronic component.

In this way, the resin composition 8 including the cationic elements among the constituent elements of the ceramic elements 1, which are ionized and deposited from the ceramic elements 1, and the resin is formed in the voids 1a of the ceramic elements 1 and the voids 3a and 3b at the interfaces between the ceramic elements 1 and the external electrodes 6a and 6b. Thereafter, the resin composition 8 is subjected to heating treatment. FIG. 5 is an enlarged cross-sectional view of a site with the external electrode 6b formed by the manufacturing method [Method 3].

Next, a ceramic electronic component according to the present invention will be described with reference to a multilayer ceramic capacitor as an example other than laminated coils.

Figure 6:
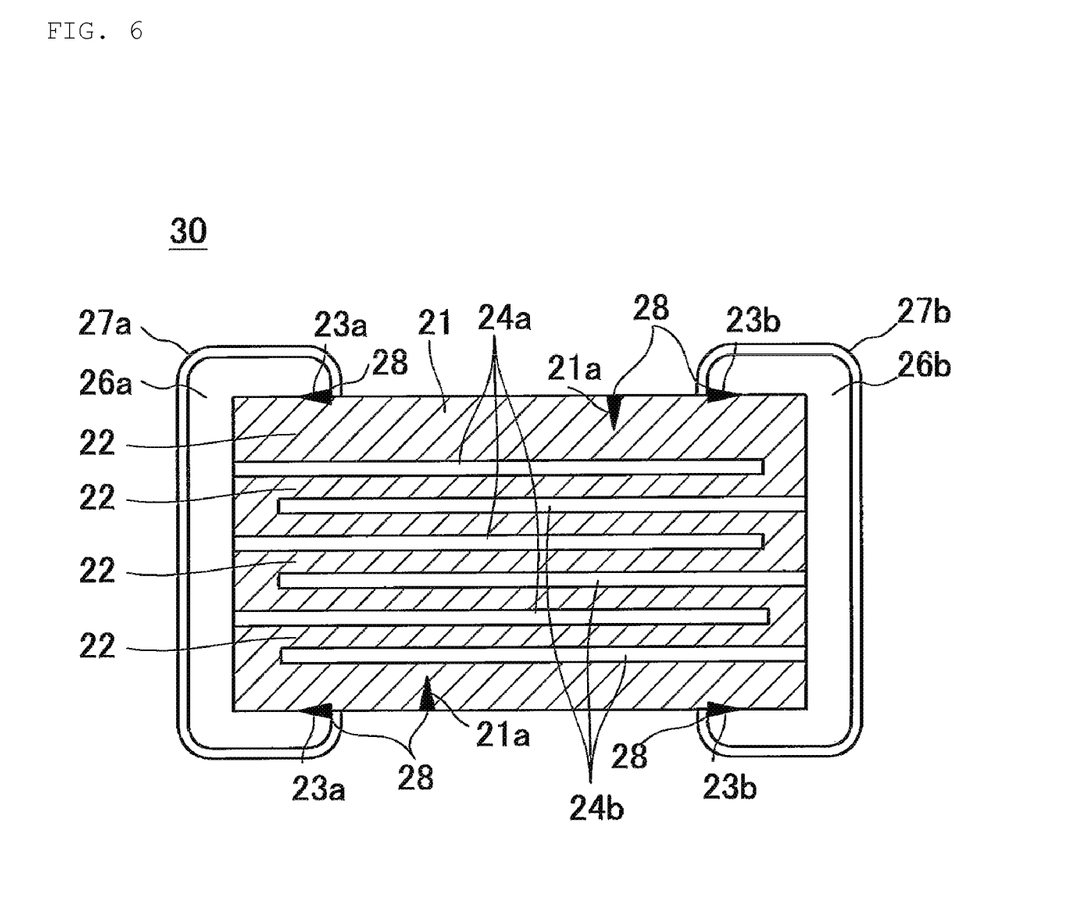
FIG. 6 is a cross-sectional view illustrating another embodiment of a ceramic electronic component according to the present invention.

FIG. 6 is a cross-sectional view illustrating a multilayer ceramic capacitor 30 that is a ceramic electronic component according to the present invention. The multilayer ceramic capacitor 30 includes a substantially cuboid ceramic element 21, and external electrodes 26a and 26b formed on right and left ends of the ceramic element 21.

The ceramic element 21 is a laminated body obtained by stacking, in the thickness direction, a number of ceramic layers 22 and multiple pairs of internal electrodes 24a and 24b opposed to each other with the ceramic layers 22 interposed therebetween.

The ceramic layers 22 are composed of a ceramic material of $Pb(Mg,Nb)O_3$—$PbTiO_3$—$Pb(Cu,W)$—$ZnO$—$MnO_2$ as a main constituent mixed with $Li_2O$—$BaO$—$B_2O_3$—$SiO_2$ as an anti-reducing agent, or a ceramic material containing $CaZrO_3$—$CaTiO_3$ as its main constituent.

The internal electrodes 24a, for example, formed to have a substantially rectangular shape in planar view, have ends extended to the left end surface of the ceramic element 21, and electrically connected to the external electrode 26a. The internal electrodes 24b, for example, formed to have a substantially rectangular shape in planar view, have ends extended to the right end surface of the ceramic element 21, and electrically connected to the external electrode 26b. Thus, a capacitor function is achieved at sites with the internal electrodes 24a and 24b opposed. The internal electrodes 24a and 24b are composed of Ag, Cu, Ni, Pd, or an alloy of the metals, etc.

The external electrodes 26a and 26b respectively have, on the surfaces thereof, plated films 27a and 27b formed. The plated films 27a and 27b protect the external electrodes 26a and 26b, and make solderability of the external electrodes 26a and 26b favorable.

This multilayer ceramic capacitor 30, for example, has voids 21a at the surface of the ceramic element 21, and has voids 23a and 23b at the interfaces between the ceramic element 21 and the external electrodes 26a and 26b. Therefore, the voids 21a of the ceramic element 21 and the voids 23a and 23b at the interfaces between the ceramic element 21 and the external electrodes 26a and 26b are each filled with a resin composition 28, as in the case of the laminated coil 10. The resin composition 28 includes a resin, and cationic elements among the constituent elements of the ceramic element 21.

The cationic elements among the constituent elements of the ceramic element 21, which are contained in the resin composition 28, are deposited by partial elution from the ceramic layers 22 of the ceramic element 21. More specifically, among the constituent elements of the ceramic element 21, the cationic elements include Pb, Mg, Nb, Ti, Ba, Li, Zn, Mn, Si, Ca, and Zr each eluted and deposited from $Pb(Mg,Nb)O_3$—$PbTiO_3$—$Pb(Cu, W)$—$ZnO$—$MnO_2$, $Li_2O$—$BaO$—$B_2O_3$—$SiO_2$, $CaZrO_3$—$CaTiO_3$, or the like of the ceramic layers.

EXAMPLES

1. Examples and Comparative Examples

Respective ceramic electronic components (laminated coils, multilayer ceramic capacitors) according to examples and comparative examples were prepared, and subjected to characterization.

2. Preparation of Examples and Comparative Examples (a) Examples 1 to 3

As shown in Table 1, the laminated coil 10 (see FIG. 1) where the voids 1a of the ceramic element 1 and the voids 3a and 3b at the interfaces between the ceramic element 1 and the external electrodes 6a and 6b were filled with the resin composition 8 was prepared by the manufacturing method [Method 1] according to the embodiment described previously.

As the resin-containing solution, a commercially available latex of a resin component dispersed in an aqueous solvent was used with an etching promoting constituent and a surfactant added thereto.

As the resin-containing solution according to Example 1, an acrylic resin (Trade Name: Nipol LX814A (from Zeon Corporation)) as the resin component was used through the adjustment of the pH to 3.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

As the resin-containing solution according to Example 2, a silicone resin (Trade Name: POLON-MF-56 (from Shin-Etsu Chemical Co., Ltd.)) as the resin component was used through the adjustment of the pH to 3.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

As the resin-containing solution according to Example 3, an epoxy resin (Trade Name: MODEPICS 302 (from Arakawa Chemical Industries, Ltd.)) as the resin component was used through the adjustment of the pH to 3.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

(b) Example 4

As shown in Table 2, the multilayer ceramic capacitor 30 (see FIG. 6) where the voids 21a of the ceramic element 21 and the voids 23a and 23b at the interfaces between the ceramic element 21 and the external electrodes 26a and 26b were filled with the resin composition 28 was prepared by the manufacturing method [Method 1] according to the embodiment described previously.

As the resin-containing solution according to Example 4, an acrylic resin (Trade Name: Nipol LX814A (from Zeon Corporation)) as the resin component was used through the adjustment of the pH to 3.0 with the addition of a sulfuric acid as the etching promoting constituent to the resin. To this resin, 1 vol % of NEWREX (registered trademark, from NOF Corporation) was added as a surfactant. The resin-containing solution was adjusted so as to have a solid content concentration of 10 wt %.

(c) Comparative Examples 1 and 2

As shown in Tables 1 and 2, a laminated coil (Comparative Example 1) and a multilayer ceramic capacitor (Comparative Example 2) were prepared which were not subjected to the treatment of forming resin composition as shown in FIG. 2.

3. Characterization and Evaluation Methods in Examples and Comparative Examples The prepared laminated coils according to Examples 1 to 3 and Comparative Example 1 and multilayer ceramic capacitors according to Example 4 and Comparative Example 2 were subjected to the evaluation of characteristic changes by the following constant temperature and humidity test.

(b) Change in Insulation Resistance by Constant Temperature and Humidity Test

For each of the multilayer ceramic capacitor according to Example 4 and Comparative Example 2, the insulation resistance was measured after leaving twenty samples for 2000 hours in a constant temperature and humidity bath set at a temperature of 85° C. and a humidity of 85%. Then, the samples with the insulation resistance of $10^7 \Omega$ (10 MΩ) or less were determined as NG (defectives) to check the incidence of defective insulation resistance. It is to be noted that the multilayer ceramic capacitors were not regarded as defectives before the constant temperature and humidity test, with the insulation resistance in excess of $10^7 \Omega$ (10 MΩ).

4. Characterization Result in Examples and Comparative Examples

Table 1 shows the results of the characterization of Examples 1 to 3 and Comparative Example 1.

Table 2 shows the results of the characterization of Example 4 and Comparative Example 2.

TABLE 1

| | | Electronic Component | Resin Composition | Resin-Containing Solution | pH | Rate of Impedance Change |
|---|---|---|---|---|---|---|
| Example | 1 | Laminated Coil | Yes | Acrylic Resin + Sulfuric Acid + Surfactant | 3.0 | 0% |
| | 2 | | | Silicone Resin + Sulfuric Acid + Surfactant | 3.0 | 0% |
| | 3 | | | Epoxy Resin + Sulfuric Acid + Surfactant | 3.0 | 0% |
| Comparative Example | 1 | Laminated Coil | No | — | — | −50% |

TABLE 2

| | | Electronic Component | Resin Composition | Resin-Containing Solution | pH | Incidence of Defective Insulation Resistance |
|---|---|---|---|---|---|---|
| Example | 4 | Multilayer Ceramic Capacitor | Yes | Acrylic Resin + Sulfuric Acid + Surfactant | 3.0 | 0% |
| Comparative Example | 2 | Multilayer Ceramic Capacitor | No | — | — | 10% |

(a) Change in Impedance by Constant Temperature and Humidity Test

For each of the laminated coils according to Examples 1 to 3 and Comparative Example 1, twenty samples were examined for the change in impedance by the constant temperature and humidity test at a rated current of 2 A for 100 hours at a temperature of 85° C. and a humidity of 85%. In this case, in particular, the rate of impedance change after the constant temperature and humidity test was examined with impedance before the constant temperature and humidity test as a reference. In addition, the average value for the twenty samples was regarded as the rate of impedance change.

From the results in Table 1, the change in impedance was −50% due to generation of migration in the untreated product (Comparative Example 1), but 0% in the compositions according to the present examples (Examples 1 to 3).

Furthermore, from the results in Table 2, the incidence of defective insulation resistance was 10% in the case of the untreated product (Comparative Example 2), but 0% in the composition according to the present example (Example 4).

It is to be noted that the invention is not to be considered limited to the previously described embodiments, but can be modified variously within the scope of the invention.

The ceramic electronic component according to the invention is used in a preferred manner, in particular, as parts of portable devices such as portable communication devices, for example, which require a reduction in size or a reduction in weight.

What is claimed is:

1. A method for manufacturing a ceramic electronic component, the method comprising:
   providing, to a surface of a ceramic element, a resin-containing solution that etches the surface of the ceramic element so as to ionize constituent elements of the ceramic element to form a resin composition comprising a resin and a cationic element that is a constituent element of the ceramic element, the resin composition at least partially filling voids of the ceramic element and at an interface between the ceramic element and an electrode.

2. The method for manufacturing a ceramic electronic component according to claim 1, wherein a pH of the resin-containing solution containing the at least one anion is less than 5 and greater than 11.

3. The method for manufacturing a ceramic electronic component according to claim 1, wherein the method further comprises washing the ceramic electronic component after applying the resin-containing solution to the surface of the ceramic element.

4. The method for manufacturing a ceramic electronic component according to claim 1, wherein the resin composition is formed after forming the electrode on the ceramic element.

5. The method for manufacturing a ceramic electronic component according to claim 1, wherein the electrode is formed on the ceramic element after forming the resin composition.

6. The method for manufacturing a ceramic electronic component according to claim 1, wherein the resin composition is formed after forming the electrode and plating a surface of the electrode.

7. The method for manufacturing a ceramic electronic component according to claim 1, wherein the resin comprises at least one of an epoxy resin, a polyimide resin, a silicone resin, a polyamideimide resin, a polyetheretherketone resin, and a fluorine-containing resin.

8. The method for manufacturing a ceramic electronic component according to claim 1, wherein the method further comprises heating the resin composition so as to cross-link resin components thereof.

9. The method for manufacturing a ceramic electronic component according to claim 1, wherein the constituent element of the ceramic element includes at least one of Ba, Ti, Ca, Zr, Fe, Ni, Cu, Zn, Mn, Co, and Si.

10. The method for manufacturing a ceramic electronic component according to claim 1, wherein the resin has a thermal decomposition temperature of 240° C. or higher.

11. The method for manufacturing a ceramic electronic component according to claim 1, further comprising forming a plated film on a surface of the electrode.

* * * * *